United States Patent [19]
Christopher, Jr. et al.

[11] Patent Number: 5,930,495
[45] Date of Patent: Jul. 27, 1999

[54] METHOD AND SYSTEM FOR PROCESSING A FIRST INSTRUCTION IN A FIRST PROCESSING ENVIRONMENT IN RESPONSE TO INTIATING PROCESSING OF A SECOND INSTRUCTION IN A EMULATION ENVIRONMENT

[75] Inventors: Kenneth Walter Christopher, Jr., Austin; David Jaramillo, Round Rock; Mary M. Snow, Austin; Richard Dale Wahl, Austin; Scott Lee Winters, Austin; Cornell G. Wright, Jr., Austin, all of Tex.

[73] Assignee: International Business Machines Corporation, Armonk, N.Y.

[21] Appl. No.: 08/783,386

[22] Filed: Jan. 13, 1997

[51] Int. Cl.⁶ .................................................. G06F 9/455
[52] U.S. Cl. ........................... 395/500; 395/527; 395/376
[58] Field of Search .................................. 395/500, 375, 395/376, 527, 737

[56] References Cited

U.S. PATENT DOCUMENTS

| | | | |
|---|---|---|---|
| 3,891,974 | 6/1975 | Coulter et al. | 395/500 |
| 4,727,480 | 2/1988 | Albright et al. | 395/500 |
| 4,951,195 | 8/1990 | Fogg et al. | 395/500 |
| 5,113,500 | 5/1992 | Talbott et al. . | |
| 5,167,023 | 11/1992 | de Nicholas et al. | 395/500 |
| 5,297,282 | 3/1994 | Meilak et al. . | |
| 5,333,266 | 7/1994 | Boaz et al. . | |
| 5,347,632 | 9/1994 | Filepp et al. . | |
| 5,373,501 | 12/1994 | Roland . | |
| 5,379,432 | 1/1995 | Orton et al. . | |
| 5,404,529 | 4/1995 | Chernikoff et al. . | |

(List continued on next page.)

OTHER PUBLICATIONS

W.F. Beausoleil et al., "Fast Host Application Access to Local Area Network Server Files", IBM Technical Disclosure Bulletin, pp. 43–48, vol. 37, No. 1, Jan. 1994.

R.R. Heisch, "Power/PowerPC Binary Incompatibility Analyzer", IBM Technical Disclosure Bulletin, pp. 91–92, vol. 37 No. 9, Sep. 1994.

U. Bapst, "Arigo–A Peer–To–Peer Home Automation Network", IBM Technical Disclosure Bulletin, pp. 217–221, vol. 38, No. 9, Sep. 1995.

D. Obermann, "Design To Enable Locale Tagging for the Database Manager", IBM Technical Disclosure Bulletin, pp. 145–153, vol. 37, No. 1 Jan. 1994.

*Primary Examiner*—Kevin J. Teska
*Assistant Examiner*—Russell W. Frejd
*Attorney, Agent, or Firm*—Richard A. Henkler; Lisa B. Yociss; Andrew J. Dillon

[57] ABSTRACT

A method and system are disclosed in a first data processing system for processing a first instruction in response to an initiation of processing of a second instruction in an emulation environment. The first data processing system includes a first architecture, a first processing environment, and an emulation environment. The first instruction is executable within the first processing environment. The emulation environment is generated by the first architecture. The emulation environment emulates a second data processing system. The second data processing system includes a second architecture and a second processing environment. The second instruction is executable within the second processing environment. A file is established within the emulation environment. The file includes a plurality of routines. Each routine is associated with one of the second plurality of instructions. One of the routines is associated with the second instruction. The routine associated with the second instruction includes an indication of the first instruction and parameters associated with the second instruction. The emulation environment initiates processing of the second instruction, and thereby processes one of the routines. In response to the initiation, the processing of the second instruction by the emulation environment is temporarily halted. The routine associated with the second instruction invokes processing of the first instruction utilizing the parameters stored in the associated routine by the first processing environment.

14 Claims, 6 Drawing Sheets

U.S. PATENT DOCUMENTS

| | | |
|---|---|---|
| 5,408,622 | 4/1995 | Fitch ................................... 395/500 |
| 5,423,023 | 6/1995 | Batch et al. . |
| 5,455,951 | 10/1995 | Bolton et al. . |
| 5,461,475 | 10/1995 | Lerner et al. . |
| 5,473,777 | 12/1995 | Moeller et al. . |
| 5,566,326 | 10/1996 | Hirsch et al. ................... 395/500 |
| 5,652,872 | 7/1997 | Richter et al. ................... 395/500 |
| 5,664,159 | 9/1997 | Richter et al. ................... 395/500 |
| 5,737,579 | 4/1998 | Kimura et al. ................... 395/500 |

METHOD AND SYSTEM FOR PROCESSING A FIRST INSTRUCTION IN A FIRST PROCESSING ENVIRONMENT IN RESPONSE TO INTIATING PROCESSING OF A SECOND INSTRUCTION IN A EMULATION ENVIRONMENT

BACKGROUND OF THE INVENTION

1. Technical Field

The present invention relates to a method and system within a first data processing system for processing a first instruction in response to an initiation of processing within an emulation environment of a second instruction, and in particular to the establishment of a file within the emulation environment which includes a routine associated with the second instruction, the routine including an indication of the first instruction. Still more particularly, the present invention relates to a method and system for processing a first instruction utilizing parameters stored in a routine which is associated with a second instruction in response to an initiation of processing within an emulation environment of the second instruction.

2. Description of the Related Art

A data processing system is implemented utilizing a particular architecture. An architecture includes the particular hardware including the central processing unit (CPU) and the microcode which defines how the CPU operates. One example of an architecture is the Power PC architecture offered by International Business Machines Corporation, Motorola, Incorporated, and Apple Computer, Incorporated. Another example is the Pentium architecture offered by Intel Corporation.

An operating system controls the execution of programs and provides the necessary link between the architecture and a software application. Operating systems are designed to operate utilizing a particular architecture. Therefore, an operating system designed to operate utilizing one architecture cannot operate unchanged utilizing a different architecture.

Software applications are designed to be executed utilizing a particular operating system, and therefore a particular architecture. There are several methods for executing a particular software application originally written for one operating system utilizing an operating system and/or an architecture different from the original combination of operating system and architecture.

One method, which may be used in some cases, is to re-compile the software application to be executable on the new architecture. Another method is for the new architecture to emulate the original architecture.

Software applications include binary files which are files including executable code. An application programming interface (API) is a functional interface supplied by an operating system that allows a software application to use specific data or functions of the operating system. Binary files typically include calls to the application programming interface. These calls may have parameters associated with them which are needed to complete the execution of the calls. In addition, once an API call has completed processing, a parameter which indicates a result of the processing of the API call may be returned to the software application. In some cases there may be multiple parameters returned to the application upon completion of the processing of the API call.

An API call is associated with a file. The file is typically a dynamic link library (DLL) file. A DLL includes executable code and/or data which is linked to the software application when the software application is loaded.

Therefore a need exists for a method and system to process a first instruction in a first processing environment in response to an initiation of processing within an emulation environment of a second instruction.

SUMMARY OF THE INVENTION

It is therefore one object of the present invention to provide a method and system within a first data processing system for processing a first instruction in a first processing environment in response to an initiation of processing within an emulation environment of a second instruction.

It is another object of the present invention to provide a method and system within a first data processing system for processing a first instruction in response to an initiation of processing within an emulation environment of a second instruction, and for the establishment of a file within the emulation environment which includes a routine associated with the second instruction, where the routine includes an indication of the first instruction.

It is yet another object of the present invention to provide a method and system within a data processing system for processing a first instruction utilizing parameters stored in a routine which is associated with a second instruction in response to an initiation of processing within an emulation environment of the second instruction.

The foregoing objects are achieved as is now described. A method and system are disclosed in a first data processing system for processing a first instruction in response to an initiation of processing of a second instruction in an emulation environment. The first data processing system includes a first architecture, a first processing environment, and an emulation environment. The first instruction is executable within the first processing environment. The emulation environment is generated by the first architecture. The emulation environment emulates a second data processing system. The second data processing system includes a second architecture and a second processing environment. The second instruction is executable within the second processing environment.

A file is established within the emulation environment. The file includes a plurality of routines. Each routine is associated with one of the second plurality of instructions. One of the routines is associated with the second instruction. The routine associated with the second instruction includes an indication of the first instruction and parameters associated with the second instruction. The emulation environment initiates processing of the second instruction, and thereby processes one of the routines. In response to the initiation, the processing of the second instruction by the emulation environment is temporarily halted. The routine associated with the second instruction invokes processing of the first instruction utilizing the parameters stored in the associated routine by the first processing environment.

The above as well as additional objectives, features, and advantages of the present invention will become apparent in the following detailed written description.

BRIEF DESCRIPTION OF THE DRAWING

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

An exemplary embodiment of the present invention and its advantages are better understood by referring to FIGS. 1–5B of the drawings, like numerals being used for like and corresponding parts of the accompanying drawings.

Figure 1:
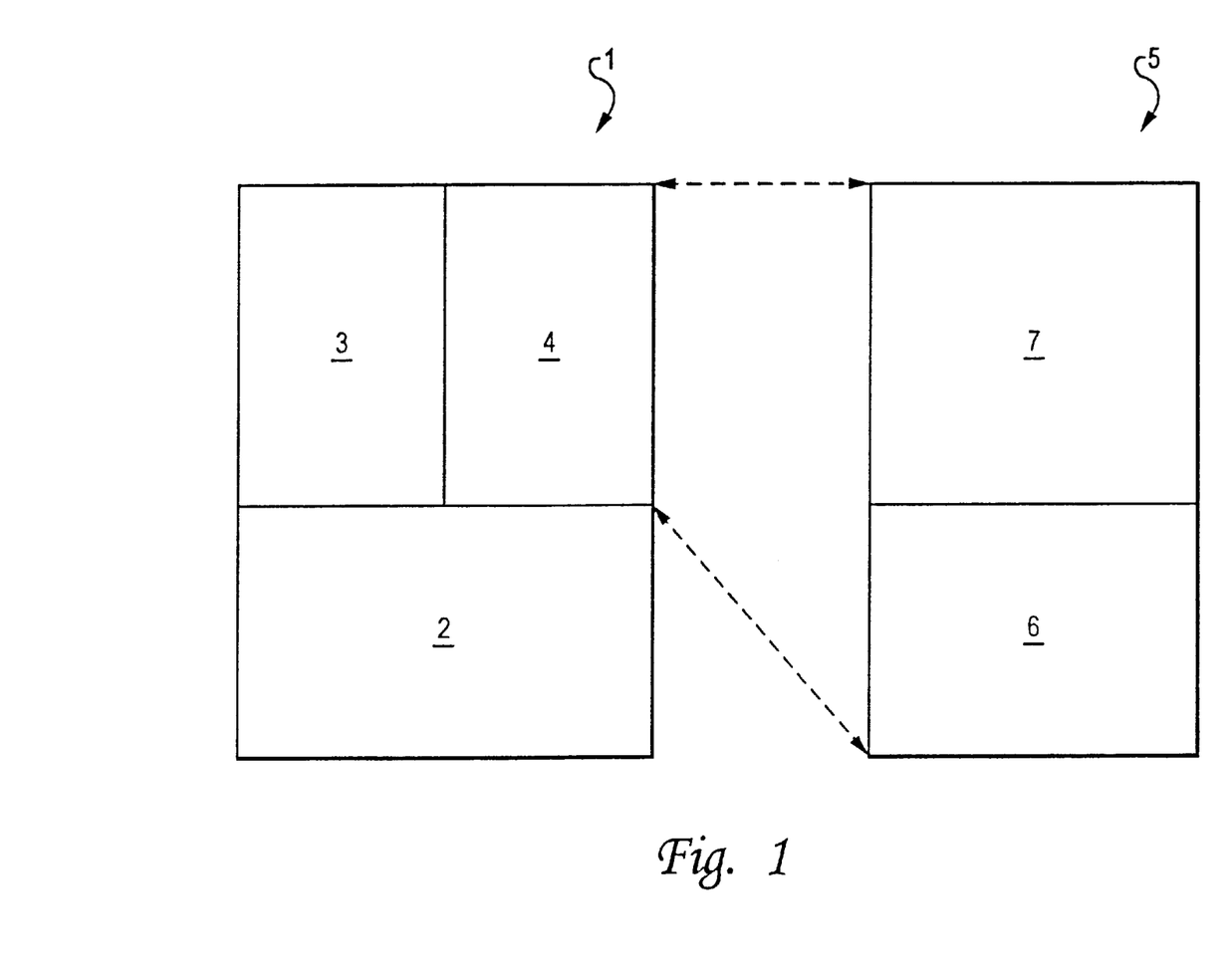
FIG. 1 depicts a pictorial representation of a first data processing system which may be utilized to implement the method and system of the present invention and a second data processing environment, the first data processing system including a first architecture, a first processing environment, and an emulation environment.

FIG. 1 depicts a pictorial representation of a first data processing system 1 which may be utilized to implement the method and system of the present invention including a first architecture 2, a first processing environment 3, and an emulation environment 4. A second data processing environment 5 includes a second architecture 6 and a second processing environment 7.

A first plurality of instructions are designed to be processed by first processing environment 3 utilizing first architecture 2, and a second plurality of instructions are designed to be processed by second processing environment 7 utilizing second architecture 6.

The second plurality of instructions are designed to be executed utilizing a particular operating system, or processing environment, and therefore a particular architecture. The second plurality of instructions are designed to be processed by second processing environment 7 and cannot be processed by first processing environment 3. In order for first data processing system 1 to process the second plurality of instructions, emulation environment 4 is utilized. Emulation environment 4 is generated by first architecture 2 and emulates second data processing system 5.

In a preferred embodiment, first architecture is preferably a Power PC architecture provided by International Business Machines Corporation, Motorola, Incorporated, and Apple Computer, Incorporated. First processing environment is preferably OS/2 for a Power PC architecture and is provided by International Business Machines Corporation. Emulation environment 4 is preferably an Instruction Set Translator provided by International Business Machines Corporation. One example of second architecture 6 is the Pentium architecture offered by Intel Corporation. An example of second processing environment 7 is OS/2 provided by International Business Machines Corporation for an Intel architecture.

The present invention includes a method and system within a first data processing system for processing a first instruction in response to an initiation of processing of a second instruction in an emulation environment. The first instruction is included within the first plurality of instructions. The second instruction is included within the second plurality of instructions.

In order to carry out the present invention, a file is established within emulation environment 4. The file includes a plurality of routines. Each of the plurality of routines is associated with a particular instruction included within the second plurality of instructions. One of the routines is associated with the second instruction. The routine associated with the second instruction includes an indication of the first instruction and parameters associated with the second instruction. Emulation environment 4 initiates processing of the second instruction. In response to the initiation, the processing of the second instruction by emulation environment 4 is temporarily halted. First processing environment 3 then processes the first instruction utilizing the parameters stored in the associated routine.

For example, a software program may be selected within first data processing system 1. The software program has been designed to operate in second data processing environment 5 and includes executable binary files which include instructions. Some of the instructions included with the binary files may include API calls. These calls are designed to operated within second processing environment 7 which is utilized in conjunction with second architecture 6. In order to run the software program within data processing system 1, a method must be used to process the binary files utilizing first architecture 2. Emulation environment 4 emulates data processing system 5 and may emulate the second plurality of instructions in order to execute the binary files.

However, in order to enhance the performance of data processing system 1, it is preferable to execute an API call which is native to first architecture 2 and first processing system 3, i.e. designed to be executed by first architecture 2 and first processing system 3, instead of emulating the original API call included within the binary utilizing emulation environment 4.

In this manner, in response to the initiation of the second instruction, a first instruction is processed within the first processing environment. When the processing of the first instruction is completed, the results of the first instruction are returned to emulation environment 4 and execution of the binary continues.

Figure 2:
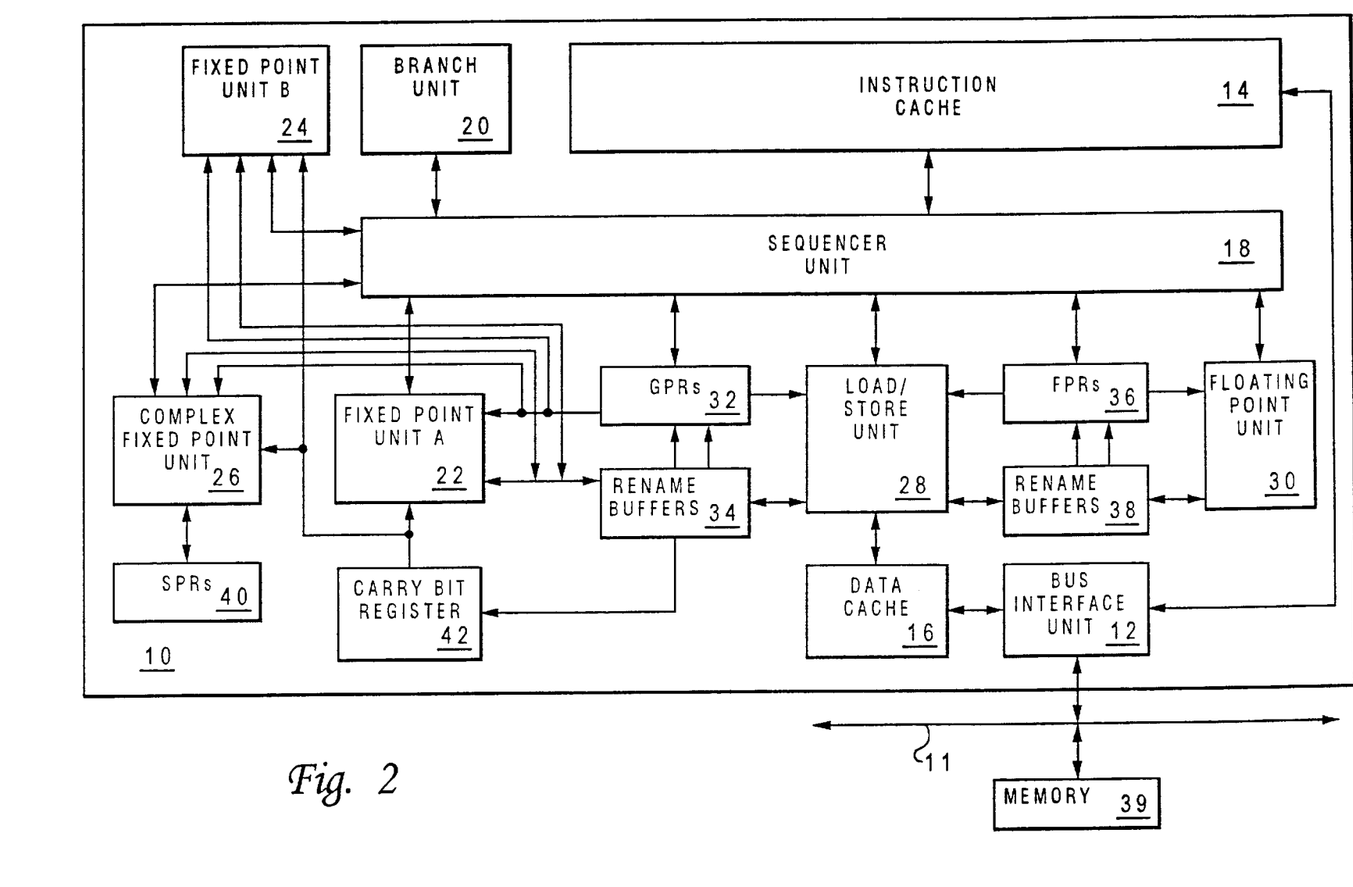
FIG. 2 illustrates a pictorial representation of a processor included within a first architecture in accordance with the method and system of the present invention.

FIG. 2 is a block diagram of a processor 10 system included within first architecture 1 for processing information according to the preferred embodiment. In the preferred embodiment, processor 10 is a single integrated circuit superscalar microprocessor. Accordingly, as discussed further herein below, processor 10 includes various units, registers, buffers, memories, and other sections, all of which are formed by integrated circuitry. Also, in the preferred embodiment, processor 10 operates according to reduced instruction set computer ("RISC")techniques. As shown in FIG. 2, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the preferred embodiment the execution circuitry of processor 10 includes multiple execution units, namely a branch unit 20, a branch target address cache 21, a fixed point unit A ("FXUA") 22, a fixed point unit B ("FXUB") 24, a complex fixed point unit ("CFXU") 26, a load/store unit ("LSU") 28, and a floating point unit ("FPU") 30. FXUA 22, FXUB 24, CFXU 26, and LSU 28 input their source operand information from general purpose architectural register ("GPRs") 32 and fixed point rename buffers 34. Moreover, FXUA 22 and FXUB 24 input a "carry bit" from a carry bit ("CA") register 42. FXUA 22, FXUB 24, CFXU 26, and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches the instructions to selected ones of execution units 20, 22, 24, 26, 28, and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28, and 30. Accordingly, each instruction is processed as a sequence of stages, each being executable in parallel with stages of other instructions. Such a technique is called "pipelining". In a significant aspect of the illustrative embodiment, an instruction is normally processed as six stages, namely fetch, decode, dispatch, execute, completion, and writeback.

In the fetch stage, sequencer unit 18 selectively inputs (from instructions cache 14) one or more instructions from one or more memory addresses storing the sequence of instructions discussed further hereinabove in connection with branch unit 20, sequencer unit 18, and branch target address cache 21.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 20, and 30 after reserving rename buffer entries for the dispatched instructions' results (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

In the illustrative embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

Figure 3:
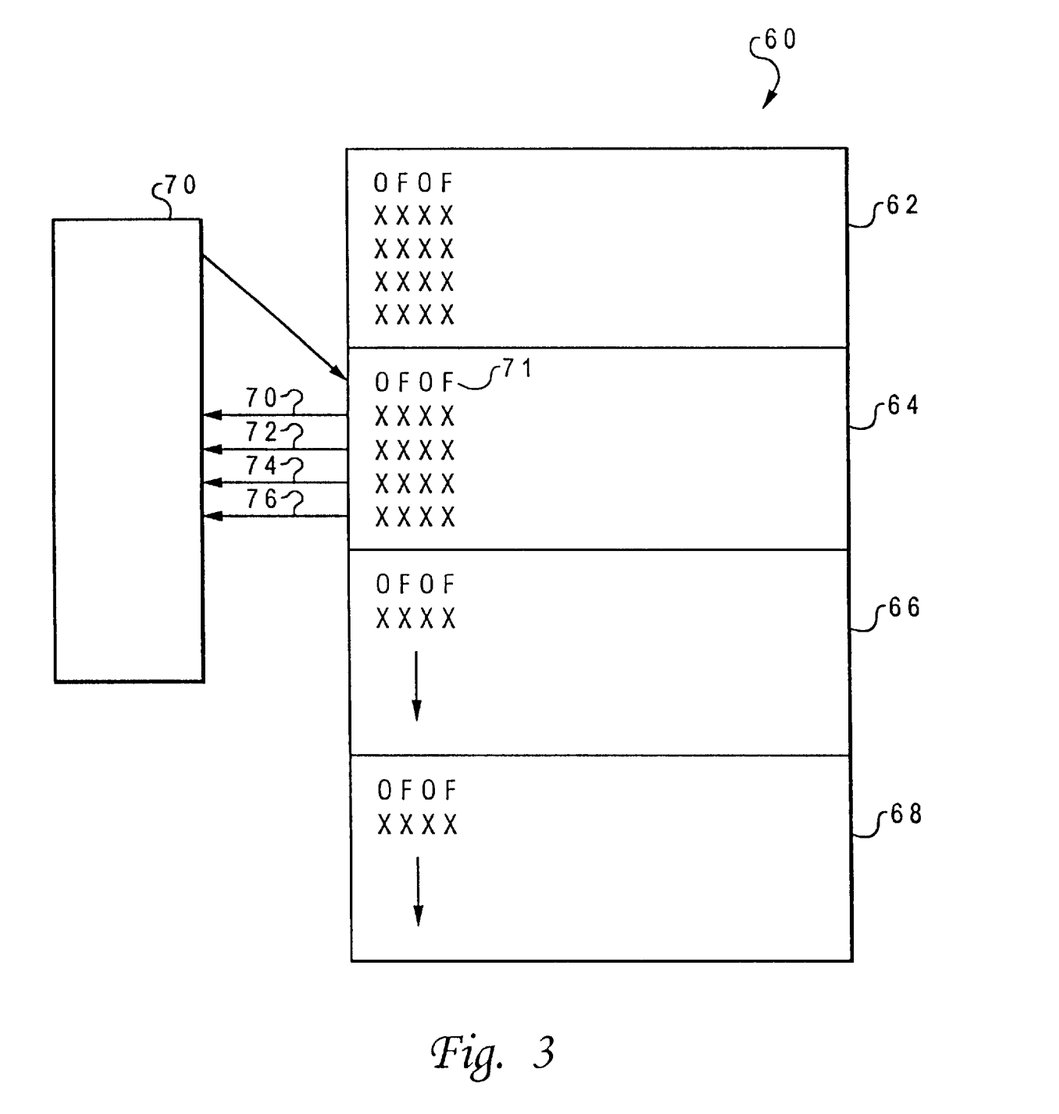
FIG. 3 depicts a pictorial representation of a file including a plurality of routines in accordance with the method and system of the present invention.

FIG. 3 depicts a pictorial representation of a file 60 including a plurality of routines 62, 64, 66, and 68 in accordance with the method and system of the present invention. File 60 is preferably a DLL file executable within data processing system 1. Each routine within file 60 is associated with a different second instruction. The second instruction is included within the second plurality of instructions. The second plurality of instructions are designed to be processed by second processing environment 7. The second instruction is also associated with a particular file, such as a DLL file. For example, routine 62 is associated with a second instruction which is associated with a DLLfile. In this manner, each routine included within file 60 is associated with a particular second instruction and DLL file. In a preferred embodiment, the second instructions are API instructions where each are associated with one of a plurality of DLL fields. Therefore, each routine included within file 60 is associated with a unique combination of an API instruction and the DLL associated with that particular API instruction.

Each routine includes an invalid instruction code, data including an indication of an associated first instruction, and parameters. For example, routine 64 includes invalid instruction code 71, parameters 70, 72, and 74, and data 76 which indicates a particular first instruction. The parameters are in a second format which is utilized by second data processing system 5. The data, including an indication of a first instruction, indicate a first instruction which is to be processed in response to an initiation of processing of the second instruction which is associated with the routine. Therefore, a routine will include a reference to the first instruction which is designed to be processed by first processing environment 3 which is associated with the second instruction. The second instruction has an associated routine, such as a particular DLL file.

Each routine includes the same invalid instruction code. In the preferred embodiment, the invalid instruction code is "0F0F". When emulation environment 4 attempts to execute "0F0F", a trap handler routine 70 is invoked. Trap handler routine 70 is designed to be executed within first processing environment 3. Once invoked, trap handler routine 70 includes a pointer to the particular invalid instruction code which caused trap handler routine 70 to be invoked. Trap handler routine 70 then converts the parameters located after the invalid instruction code from a second format into a first format. Trap handler routine 70 also uses data included within the particular routine to determine a first instruction to be processed. The first instruction is then processed using the converted parameters. When the first instruction has completed processing, a result is returned to trap handler routine 70. Trap handler routine 70 then converts the result from the first format into the second format and returns the result to emulation environment 4.

Figure 4:
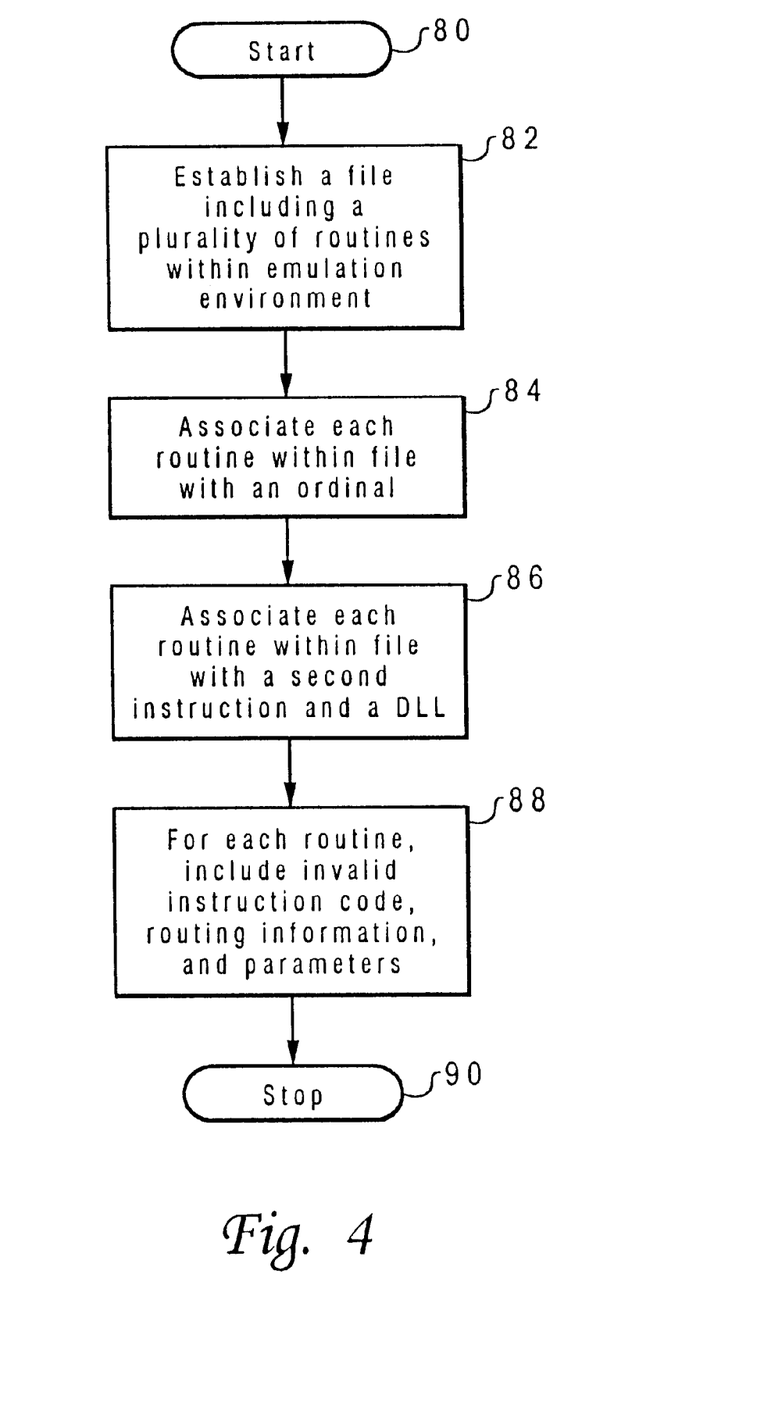
FIG. 4 is a high level flow chart illustrating the creation of a file which includes a plurality of routines in accordance with the method and system of the present invention.

FIG. 4 is a high level flow chart illustrating the creation of a file which includes a plurality of routines in accordance with the method and system of the present invention. The process starts as depicted at block 80 and thereafter passes to block 82 which illustrates the establishment, within emulation environment 4, of a file 60 including a plurality of routines. The file is a DLL file. Next, block 84 depicts the association of each the routines with an ordinal. The ordinal is a unique number within a particular DLL which indicates a location within the DLL. The ordinal associated with a routine indicates the beginning point within the DLL where the routine is located.

Then, block 86 illustrates the association of each routine included within file 60 with a particular combination of a second instruction and a DLL field. The second instruction is an instruction which is native to second data processing system 5. For example, second instruction may be an API call which is designed to be processed within processing environment 7. The second instruction a file, such as a DLL field, which is called by the second instruction. Therefore, each routine within file 60 is associated with a particular API call to a particular DLL file. Thereafter, block 86 illustrates including an invalid instruction, routing information, and parameters within the routine for each routine included within file 60. The invalid instruction, routing information, and parameters are in a second format which is native to second data processing system 5. The routing information includes an indication of a first instruction. The first instruction is native to first data processing system 1. It is designed to be processed within processing environment 3. The first instruction is the instruction native to data processing system 1 which is approximately equivalent to its associated second instruction which is native to data processing system 5. The parameters included within the routine are parameters associated with the second instruction to be utilized during the processing of the second instruction. The process terminates as depicted by block 90.

Figure 5A:
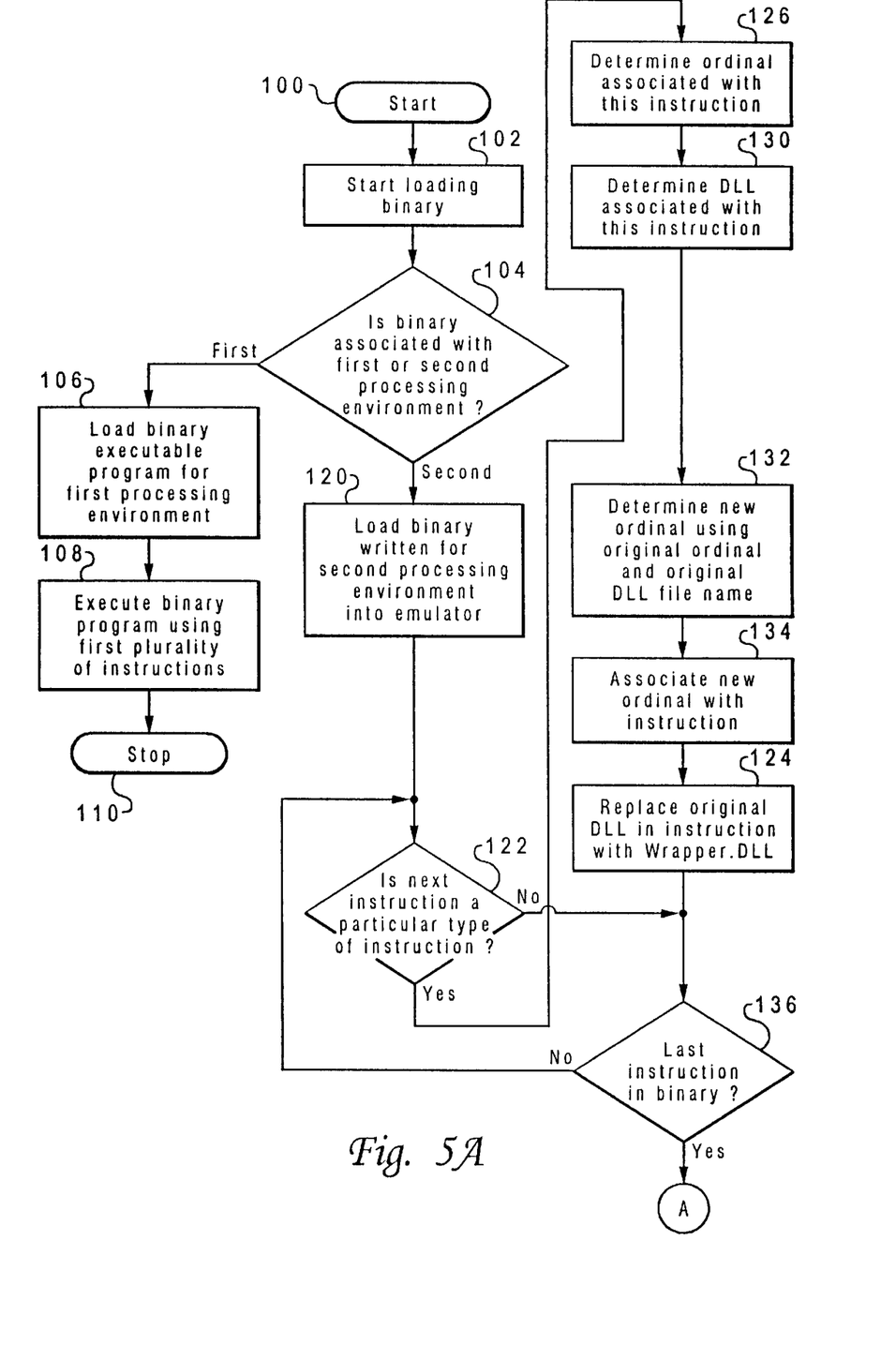
FIGS. 5A and 5B together are a high level flow chart depicting the processing of a first instruction in a first processing environment in response to an initiation of processing within an emulation environment of a second instruction.
Figure 5B:
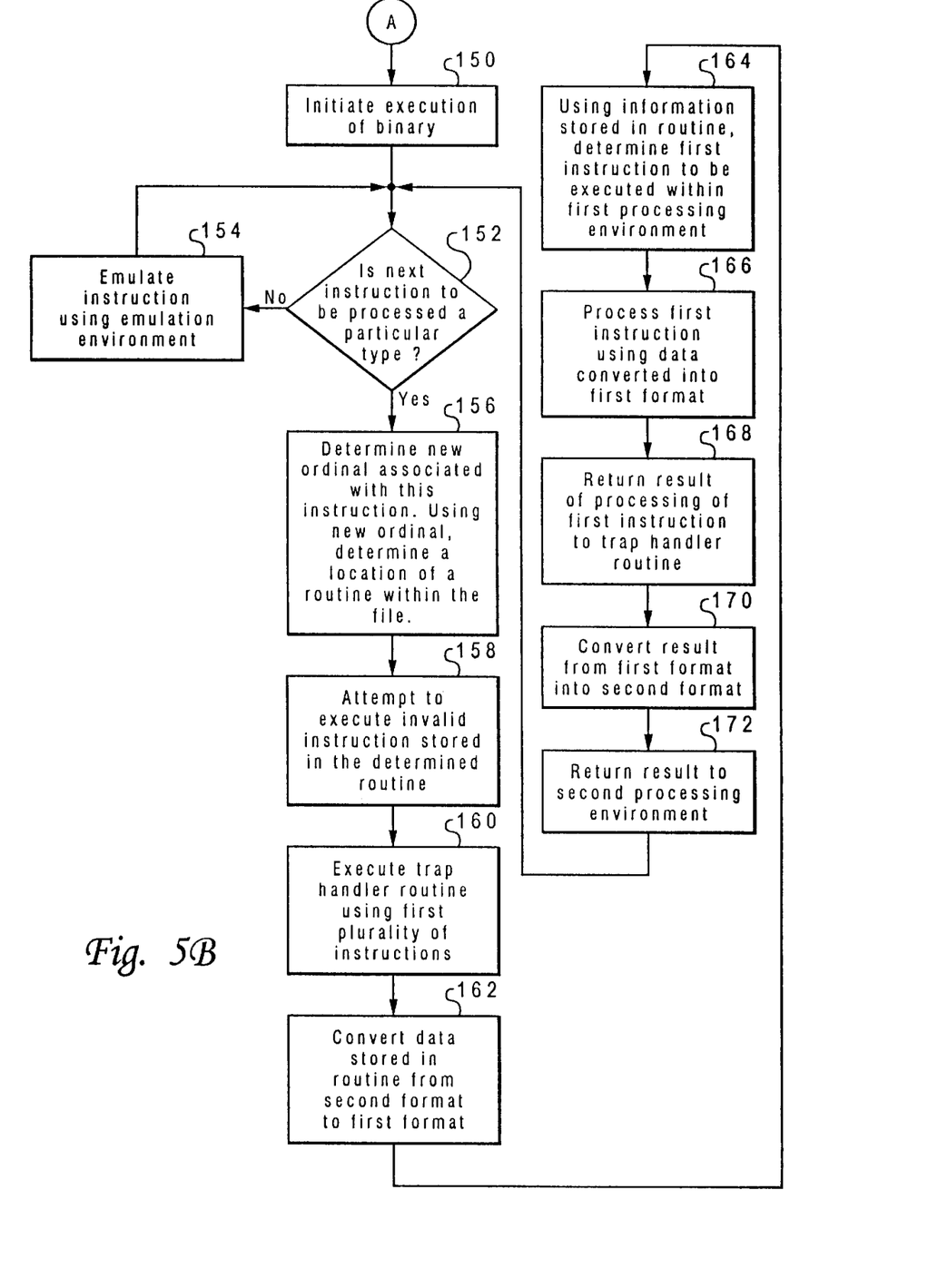

FIGS. 5A and 5B together are a high level flow chart depicting the processing of a first instruction in response to an initiation of processing within an emulation environment of a second instruction. The process starts as depicted at block 100 when a software program is selected and thereafter passes to block 102 which illustrates the initiation of the loading of a binary associated with the software program into first data processing system 1. Next, the process passes to block 104 which depicts a determination of whether or not the binary is associated with a first or second processing environment. If a determination is made that the binary is associated with a first processing environment, the process passes to block 106 which depicts the loading of the binary in the first processing environment. Next, block 108 illustrates the execution of the binary file using a first plurality of instructions. The first plurality of instructions are those instructions designed to be processed within first processing environment 3. The process then terminates as depicted at block 110.

Referring again to block 104, if a determination is made that the binary is associated with a second processing environment, the process passes to block 120 which depicts the loading of the binary into emulation environment 4. Next, block 122 illustrates a determination of whether or not the next instruction included within the binary to be loaded is a particular type of instruction. One example of a particular type of instruction is an API instruction. If a determination is made that the next instruction is not a particular type of instruction, the process passes to block 124. Referring again to block 122, if a determination is made that the next instruction is a particular type of instruction, the process passes to block 126 which illustrates a determination of the ordinal associated with the instruction. Application Programming Interface instructions typically have an associated ordinal, or unique, number. The API instructions also include an associated DLL file. The ordinal number is utilized to indicate the entry point into the associated DLL file for the particular API instruction.

Next, block 130 depicts a determination of a DLL file associated with this instruction. Thereafter, block 132 illustrates a determination of a new ordinal number. Using the original ordinal number and the original the DLL file name, a new ordinal number is calculated. Block 134 then depicts the association of the new ordinal number with the instruction. Next, block 124 illustrates the replacement of the indication of the original DLL file name with an indication of file 60 in the instruction. The process then passes to block 136.

Block 136 illustrates a determination of whether or not the last instruction in the binary file has been loaded. If a determination is made that the last instruction has not been loaded, the process passes back to block 122. Referring again to block 136, if a determination is made that the last instruction has been loaded, the process passes to block 150 as illustrated through connector A. Block 150 depicts an initiation of the execution of the binary file.

Thereafter, block 152 depicts a determination of whether or not the next instruction to be processed is a particular type. Preferably, this is a determination of whether or not the next is an API instruction. If a determination is made that the next instruction is not a particular type of instruction, the process passes to block 154. Block 154 illustrates an emulation of the instruction using emulation environment 4. Referring again to block 152, if a determination is made that the next instruction is a particular type of instruction, the process passes to block 156 which depicts the determination of the new ordinal associated with this instruction. Using the new ordinal number, a determination is made of the location of a routine within file 60. For example, the instruction may have an ordinal of "second" which indicates a location of routine 64 within file 60.

Thereafter, block 25 depicts the attempt by the emulation environment to process the first instruction within the determined routine. The first instruction is an instruction code which is an invalid instruction code for the data processing system which is being emulated by the emulation environment. For example, within a data processing system which includes OS/2 for an Intel architecture, the instruction code "0F0F" is an invalid instruction code. The process then passes to block 160 which illustrates the execution of trap handler routine 70. Trap handler routine 70 is invoked upon an attempt to execute a particular invalid instruction code. Trap handler routine 70 is executed within the first processing environment using the first plurality of instructions. When trap handler routine 70 is invoked by a particular routine within file 60, a pointer points to the invalid instruction code which caused trap handler routine 70 to be invoked.

Next, block 162 depicts converting the parameters which follow the particular invalid instruction code which caused trap handler routine 70 to be invoked. Once invoked, trap handler routine 70 uses the pointer to locate the parameters which are included within the routine associated with the second instruction. Trap handler routine 70 converts these parameters from a second format which is utilized by second data processing system 5 to a first format which is utilized by first processing environment 3.

The process then passes to block 164 which illustrates the determination of a first instruction using the indication of a first instruction included within the routine which caused trap handler routine 70 to be invoked. The first instruction is approximately equivalent to the second instruction which is associated with the routine. Thereafter, block 166 depicts the processing of the first instruction within first processing environment 3 using the converted parameters. Block 168 depicts the returning of the result of the processing of the first instruction to trap handler routine 70. Next, block 170 illustrates trap handler routine 70 converting the result from the first format into the second format. The process then passes to block 172 which depicts trap handler routine 70 returning the result in the second format to second processing environment. Thereafter, the process passes back to block 152.

While the invention has been particularly shown and described with reference to a preferred embodiment, it will be understood by those skilled in the art that various changes in form and detail may be made therein without departing from the spirit and scope of the invention.

We claim:

1. A method in a first data processing system including a first architecture and a first processing environment for processing one of a first plurality of instructions in response to an initiation of processing within an emulation environment of one of a second plurality of instructions, said first architecture generating said emulation environment, said one of said first plurality of instructions being native to said first processing environment, and said one of said second plurality of instructions being foreign to said first processing environment and native to a second processing environment included within a second data processing system which includes a second architecture, said one of said first plurality of instructions being an equivalent instruction in said first processing environment corresponding to said one of said second plurality of instructions, said emulation environment emulating said second processing environment, said method comprising the steps of:

establishing a file within said emulation environment, said file including a plurality of routines, each of said plurality of routines being associated with a different one of said second plurality of instructions;

associating one of said plurality of routines with said one of said second plurality of instructions, said one of said plurality of routines including an indication of said one of said native first plurality of instructions;

said emulation environment initiating processing of said one of said second plurality of instructions, wherein said one of said plurality of routines is processed;

in response to said initiation of processing of said one of said second plurality of instructions, temporarily halting processing of said one of said second plurality of instructions within said emulation environment; and thereafter, said one of said plurality of routines invoking processing of said one of said first plurality of instructions by said first processing environment, wherein said one of said first plurality of instructions which is native to said first processing environment is processed in response to an initiation of a processing of said equivalent, corresponding one of said second plurality of instructions which is foreign to said first processing environment such that said one of said second plurality of instructions is not emulated.

2. The method according to claim 1, further comprising the step of associating a plurality of parameters with said one of said second plurality of instructions, said one of said plurality of routines associated with said one of said second plurality of instructions including said plurality of parameters, wherein said plurality of parameters included within said one of said plurality of routines are in a second format capable of being utilized within said emulation environment, further comprising the step of converting said plurality of parameters from said second format to a first format capable of being utilized within said first processing environment, wherein said first processing environment processes said one of said first plurality of instructions utilizing said plurality of parameters in said first format.

3. The method according to claim 2 wherein said one of said second plurality of instructions is associated with one of a plurality of libraries, wherein said one of said plurality of routines associated with said one of said second plurality of instructions is also associated with said one of said plurality of libraries.

4. The method according to claim 3 further comprising the steps of:

establishing a handling routine within said first processing environment;

in response to an initiation of processing of said one of said second plurality of instructions by said emulation environment, invoking said handling routine;

said handling routine converting said plurality of parameters from said second format to said first format; and said handling routine invoking processing of said one of said first plurality of instructions by said first processing environment utilizing said plurality of parameters in said first format.

5. The method according to claim 4 further comprising the step of including an invalid instruction code within each of said plurality of routines, wherein said invalid instruction code is associated with said one of said second plurality of instructions, said handling routine being invoked upon said emulation environment attempting to process said invalid instruction code.

6. The method according to claim 5 wherein said one of said first plurality of instructions is functionally equivalent to said one of said second plurality of instructions.

7. The method according to claim 6, further comprising the steps of:

in response to said emulation environment initiating processing of said one of said second plurality of instructions by processing said one of said plurality of routines, said emulation environment attempting to execute said invalid instruction code included within said one of said plurality of routines; and in response to said attempt to execute said invalid instruction code, invoking said handling routine which invokes processing of said one of said first plurality of instructions by said first processing environment.

8. A first data processing system including a first architecture and a first processing environment for processing one of a first plurality of instructions in response to an initiation of processing within an emulation environment of one of a second plurality of instructions, said first architecture generating said emulation environment, said one of said first plurality of instructions being native to said first processing environment, and said one of said second plurality of instructions being foreign to said first processing environment and native to a second processing environment included within a second data processing system which includes a second architecture, said one of said first plurality of instructions being an equivalent instruction in said first processing environment corresponding to said one of said second plurality of instructions, said emulation environment emulating said second processing environment, comprising:

means for establishing a file within said emulation environment, said file including a plurality of routines, each of said plurality of routines being associated with a different one of said second plurality of instructions;

means for associating one of said plurality of routines with said one of said second plurality of instructions, said one of said plurality of routines including an indication of said one of said native first plurality of instructions;

means for said emulation environment initiating processing of said one of said second plurality of instructions, wherein said one of said plurality of routines is processed;

means for in response to said initiation of processing of said one of said second plurality of instructions, temporarily halting processing of said one of said second plurality of instructions within said emulation environment; and means for thereafter, said one of said plurality of routines invoking processing of said one of said first plurality of instructions by said first processing environment, wherein said one of said first plurality of instructions which is native to said first processing environment is processed in response to an initiation of a processing of said equivalent, corresponding one of said second plurality of instructions which is foreign to said first processing environment such that said one of said second plurality of instructions is not emulated.

9. The system according to claim 8, further comprising means for associating a plurality of parameters with said one of said second plurality of instructions, said one of said plurality of routines associated with said one of said second plurality of instruction including said plurality of parameters, wherein said plurality of parameters included within said one of said plurality of routines are in a second format capable of being utilized within said emulation environment, further comprising means for converting said plurality of parameters from said second format to a first format capable of being utilized within said first processing environment, wherein said first processing environment processes said one of said first plurality of instructions utilizing said plurality of parameters in said first format.

10. The system according to claim 9 wherein said one of said second plurality of instructions is associated with one of a plurality of libraries, wherein said one of said plurality of routines associated with said one of said second plurality of instructions is also associated with said one of said plurality of libraries.

11. The system according to claim 10 further comprising:

means for establishing a handling routine within said first processing environment;

means for in response to an initiation of processing of said one of said second plurality of instructions by said emulation environment, invoking said handling routine;

means for said handling routine converting said plurality of parameters from said second format to said first format; and means for said handling routine invoking processing of said one of said first plurality of instructions by said first processing environment utilizing said plurality of parameters in said first format.

12. The system according to claim 11 further comprising means for including an invalid instruction code within each of said plurality of routines, wherein said invalid instruction code is associated with said one of said second plurality of instructions, said handling routine being invoked upon said emulation environment attempting to process said invalid instruction code.

13. The system according to claim 12 wherein said one of said first plurality of instructions is functionally equivalent to said one of said second plurality of instructions.

14. The system according to claim 13, further comprising:

means responsive to said emulation environment initiating processing of said one of said second plurality of instructions by processing said one of said plurality of routines, for said emulation environment attempting to execute said invalid instruction code included within said one of said plurality of routines; and means responsive to said attempt to execute said invalid instruction code, for invoking said handling routine which invokes processing of said one of said first plurality of instructions by said first processing environment.

* * * * *

UNITED STATES PATENT AND TRADEMARK OFFICE
CERTIFICATE OF CORRECTION

PATENT NO. : 5,930,495
DATED : July 27, 1999
INVENTOR(S) : Christopher, Jr. et al.

It is certified that error appears in the above-identified patent and that said Letters Patent is hereby corrected as shown below:

Column 9, Line 28 delete "25" and replace with --158--.

Signed and Sealed this

Twenty-third Day of May, 2000

Attest:

Q. TODD DICKINSON

*Attesting Officer*          *Director of Patents and Trademarks*